(12) United States Patent
Kim et al.

(10) Patent No.: US 10,177,410 B2
(45) Date of Patent: Jan. 8, 2019

(54) LITHIUM SECONDARY BATTERY ELECTROLYTE AND LITHIUM SECONDARY BATTERY INCLUDING SAME

(71) Applicant: SK Innovation Co., Ltd., Seoul (KR)

(72) Inventors: Jin Sung Kim, Daejeon (KR); Cheol Woo Kim, Daejeon (KR); Hyo Seung Park, Daejeon (KR); Sung Yon Oh, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 163 days.

(21) Appl. No.: 15/104,721

(22) PCT Filed: Dec. 19, 2014

(86) PCT No.: PCT/KR2014/012571
§ 371 (c)(1),
(2) Date: Jun. 15, 2016

(87) PCT Pub. No.: WO2015/093889
PCT Pub. Date: Jun. 25, 2015

(65) Prior Publication Data
US 2016/0322665 A1    Nov. 3, 2016

(30) Foreign Application Priority Data

Dec. 19, 2013 (KR) .......... 10-2013-0159672

(51) Int. Cl.
| | |
|---|---|
| *H01M 10/0567* | (2010.01) |
| *H01M 10/0569* | (2010.01) |
| *H01M 10/0568* | (2010.01) |
| *H01M 10/052* | (2010.01) |
| *H01M 4/505* | (2010.01) |
| *H01M 4/525* | (2010.01) |
| *H01M 4/131* | (2010.01) |
| *H01M 4/133* | (2010.01) |
| *H01M 4/134* | (2010.01) |
| *H01M 4/38* | (2006.01) |
| *H01M 4/40* | (2006.01) |
| *H01M 4/583* | (2010.01) |
| *H01M 10/0525* | (2010.01) |
| *H01M 10/056* | (2010.01) |
| *H01M 4/36* | (2006.01) |

(52) U.S. Cl.
CPC ....... *H01M 10/0567* (2013.01); *H01M 4/131* (2013.01); *H01M 4/133* (2013.01); *H01M 4/134* (2013.01); *H01M 4/382* (2013.01); *H01M 4/405* (2013.01); *H01M 4/505* (2013.01); *H01M 4/525* (2013.01); *H01M 4/583* (2013.01); *H01M 10/052* (2013.01); *H01M 10/056* (2013.01); *H01M 10/0525* (2013.01); *H01M 10/0568* (2013.01); *H01M 10/0569* (2013.01); *H01M 4/364* (2013.01)

(58) Field of Classification Search
CPC ........ H01M 10/0567; H01M 10/0569; H01M 10/0568; H01M 10/052; H01M 10/056; H01M 10/0525; H01M 4/505; H01M 4/525; H01M 4/131; H01M 4/133; H01M 4/134; H01M 4/382; H01M 4/405; H01M 4/583; H01M 4/364
See application file for complete search history.

(56) References Cited

U.S. PATENT DOCUMENTS

| | | |
|---|---|---|
| 5,879,834 A | 3/1999 | Mao |
| 7,736,812 B2 | 6/2010 | Han et al. |
| 2006/0172201 A1 | 8/2006 | Yasukawa et al. |
| 2009/0311611 A1 | 12/2009 | Wu et al. |

FOREIGN PATENT DOCUMENTS

| | | | |
|---|---|---|---|
| CN | 101124695 A | | 2/2008 |
| JP | 11-219723 | * | 8/1999 |
| JP | 11219723 A | | 8/1999 |
| JP | 2000-294272 | * | 10/2000 |
| JP | 2000294272 A | | 10/2000 |
| JP | 2002260725 A | | 9/2002 |
| JP | 2003234127 A | | 8/2003 |
| KR | 1020050005354 A | | 1/2005 |

* cited by examiner

*Primary Examiner* — Laura Weiner
(74) *Attorney, Agent, or Firm* — The Webb Law Firm

(57) ABSTRACT

Provided are a lithium secondary battery electrolyte and a lithium secondary battery. The lithium secondary battery electrolyte includes a lithium salt, a non-aqueous organic solvent, and a pyrrole derivative. The lithium secondary battery includes a cathode, an anode, a separator, and the lithium secondary battery electrolyte. The secondary battery electrolyte according to the present invention has advantages of excellent stability at a high temperature and high discharge capacity at a low temperature.

16 Claims, No Drawings

LITHIUM SECONDARY BATTERY ELECTROLYTE AND LITHIUM SECONDARY BATTERY INCLUDING SAME

CROSS-REFERENCE TO RELATED APPLICATIONS

This application is the United States national phase of International Application No. PCT/KR2014/012571 filed Dec. 19, 2014, and claims priority to Korean Patent Application No. 10-2013-0159672 filed Dec. 19, 2013, the disclosures of which are hereby incorporated in their entirety by reference.

BACKGROUND OF THE INVENTION

Technical Field

The present invention relates to a lithium secondary battery electrolyte and a lithium secondary battery comprising the same, and more particularly, to a lithium secondary battery electrolyte containing a pyrrole derivative, and a lithium secondary battery comprising the same.

Background Art

Recently, as portable electronic devices have widely spread, in accordance with rapid miniaturization, lightness, and thinness of the portable electronic devices, in a battery, which is a power supply of the portable electronic devices, development of a secondary battery having a small size and a light weight, being charged and discharged over a long period of time, and having excellent high rate characteristics has been urgently demanded.

Among the currently applied secondary batteries, a lithium secondary battery developed in the early 1990s has been spotlighted due to advantages such as a high operation voltage and significantly high energy density as compared to conventional batteries using an aqueous electrolyte such as a Ni-MH battery, a Ni—Cd battery, and a lead sulfate battery, and the like. However, in the lithium secondary battery as described above, there are safety problems such as ignition and explosion, and the like, caused by using a non-aqueous electrolyte. As a capacity density of the battery is increased, this problem becomes more severe.

In a non-aqueous electrolyte secondary battery, there is a serious problem such as safety deterioration of the battery generated at the time of continuous charging. One of the causes affecting the battery is heat generation due to collapse of a cathode structure. An operation principle thereof is as follows. That is, a cathode active material of a non-aqueous electrolyte battery is composed of lithium, a lithium containing metal oxide capable of intercalating and releasing lithium ions, and/or the like, and as a large amount of lithium is detached at the time of over-charge, a structure of the cathode active material as described above is changed to a thermally unstable structure. In this over-charge state, when a battery temperature reaches a critical temperature due to external physical impact, for example, exposure to a high temperature, or the like, oxygen is released from the cathode active material having the unstable structure, and the released oxygen generates an exothermic decomposition reaction with an electrolyte solvent, or the like. Particularly, since combustion of the electrolyte is further accelerated by oxygen released from the cathode, the battery may be ignited or ruptured due to thermal runaway caused by a series of exothermic reactions as described above.

In order to suppress the above-mentioned ignition or rupture due to an increase in a temperature in the battery, a method of adding an aromatic compound to the electrolyte as a redox shuttle additive has been used. For example, a non-aqueous lithium ion battery capable of preventing over-charge current and a thermal runaway phenomenon caused by the over-charge current by using an aromatic compound such as biphenyl has been disclosed in Japanese Patent No. 2002-260725. In addition, a method of improving safety of a battery by adding a small amount of an aromatic compound such as biphenyl, 3-chlorothiophene, or the like, to increase an internal resistance by electrochemical neutralization in an abnormal over-voltage state has been disclosed in U.S. Pat. No. 5,879,834.

However, in the case of using the additive such as biphenyl, or the like, there are problems in that when a relatively high voltage is locally generated in a general operation voltage, the additive is gradually decomposed during a charge and discharge process, or when the battery is discharged at a high temperature for a long period of time, an amount of biphenyl, or the like, may be gradually decreased, such that safety may not be secured after 300 charge and discharge cycles. In addition, there is a problem in storage characteristics, or the like.

Therefore, research for improving safety at high and low temperatures while still having a high capacity retention rate has been demanded.

SUMMARY OF THE INVENTION

Disclosure

Technical Problem

An object of the present invention is to provide a lithium secondary battery electrolyte capable of having excellent high temperature and low temperature characteristics while properly maintaining basic performance such as high-efficiency charge and discharge characteristics, life cycle characteristics, and the like, and a high-voltage lithium secondary battery comprising the same.

Technical Solution

In one general aspect, a lithium secondary battery electrolyte contains:
a lithium salt;
a non-aqueous organic solvent; and
a pyrrole derivative represented by the following Chemical Formula 1:

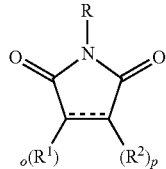

[Chemical Formula 1]

(in Chemical Formula 1,
R is cyano, hydroxy, (C1-C5)alkyl, (C1-C5)alkoxy, (C1-C5)alkoxycarbonyl, or (C6-C12)aryl;
⸗ is a single bond or a double bond;
$R^1$ and $R^2$ are each independently hydrogen or (C1-C5) alkyl; and
o and p are integers of 1 to 2;

alkyl, alkoxy, alkoxycarbonyl, and aryl of R may be further substituted with hydroxy, (C1-C5)alkyl, (C1-C5) alkoxy, or (C1-C5)alkoxycarbonyl).

In Chemical Formula 1, preferably, R may be cyano, (C1-C5)alkyl, or (C1-C5)alkoxycarbonyl.

In Chemical Formula 1, R may be cyano, methyl, ethyl, tert-butyl, methoxycarbonyl, ethoxycarbonyl, propoxycarbonyl, or tert-butoxy.

The pyrrole derivative represented by Chemical Formula 1 may be selected from compounds having the following structures, but is not limited thereto.

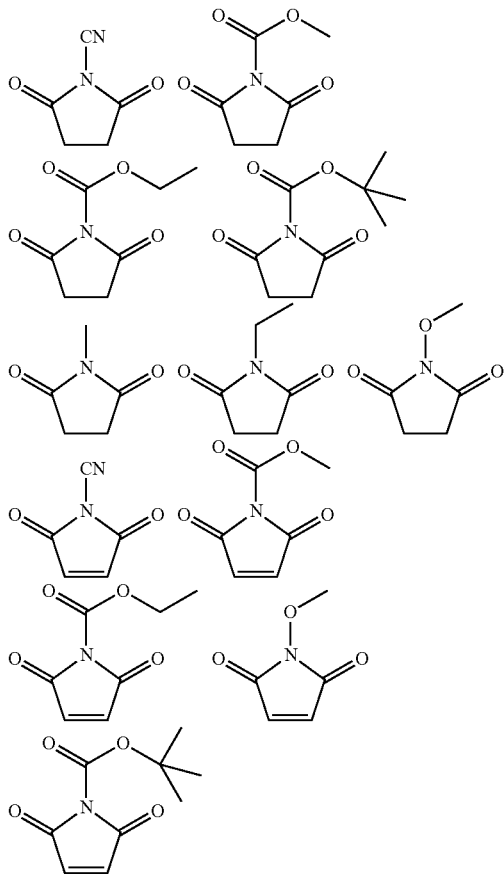

The pyrrole derivative represented by Chemical Formula 1 may be contained at a content of 1 to 5 wt % based on a total weight of the electrolyte.

The electrolyte may further contain one or two or more additives selected from the group consisting of oxalatoborate based compounds, carbonate based compounds substituted with fluorine, vinylidene carbonate based compounds, and compounds containing a sulfinyl group.

The electrolyte may further contain an additive selected from the group consisting of lithium difluoro(oxalato)borate (LiFOB), lithium bis(oxalato)borate (LiB($C_2O_4$)$_2$, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone, and propene sultone (PRS).

The additive may be contained at a content of 0.1 to 5.0 wt % based on a total weight of the electrolyte.

The non-aqueous organic solvent may be selected from cyclic carbonate based solvents, linear carbonate based solvent, and a mixed solvent thereof, wherein the cyclic carbonate may be selected from the group consisting of ethylene carbonate, propylene carbonate, butylene carbonate, vinylene carbonate, vinylethylene carbonate, fluoroethylene carbonate, and a mixture thereof, and the linear carbonate may be selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

The non-aqueous organic solvent may be a mixed solvent in which the linear carbonate based solvent and the cyclic carbonate based solvent are mixed at a mixed volume ratio of 1 to 9:1.

The lithium salt may be one or two or more selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (here, x and y are natural numbers), LiCl, LiI, and $LiB(C_2O_4)_2$.

The lithium salt may be contained at a concentration of 0.1 to 2.0M.

In addition, the present invention provides a lithium secondary battery contains the lithium secondary battery electrolyte as described above.

Advantageous Effects

A lithium secondary battery electrolyte according to the present invention contains a pyrrole derivative, such that a swelling phenomenon that the battery is swelled at a high temperature may be significantly decreased, such that the lithium secondary battery electrolyte may have excellent high temperature storage characteristics.

Further, the lithium secondary battery electrolyte according to the present invention contains the pyrrole derivative corresponding to a compound having a cyano, alkyl, alkoxy, or alkoxy carbonyl substituent at the N position, such that low-temperature discharge capacity as well as a high-temperature capacity recovery rate may be significantly high.

Therefore, a lithium secondary battery containing the lithium secondary battery electrolyte according to the present invention has excellent high-temperature storage stability and low-temperature characteristics while properly maintaining basic performance such as high-efficiency charge and discharge characteristics, life cycle characteristics, and the like.

DESCRIPTION OF THE INVENTION

[Best Mode]

Hereinafter, the present invention will be described in more detail. Here, technical terms and scientific terms used in the present specification have the general meaning understood by those skilled in the art to which the present invention pertains unless otherwise defined, and a description for the known function and configuration unnecessarily obscuring the gist of the present invention will be omitted in the following description.

The present invention relates to a lithium secondary battery electrolyte in order to provide a battery having significantly excellent discharge capacity at a low temperature while having excellent high-temperature storage characteristics and life cycle characteristics.

The present invention provides a lithium secondary battery electrolyte containing a lithium salt; a non-aqueous organic solvent; and a pyrrole derivative represented by the following Chemical Formula 1:

[Chemical Formula 1]

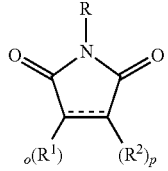

(in Chemical Formula 1,
R is cyano, hydroxy, (C1-C5)alkyl, (C1-C5)alkoxy, (C1-C5)alkoxycarbonyl, or (C6-C12)aryl;
⚌ is a single bond or a double bond;
$R^1$ and $R^2$ are each independently hydrogen or (C1-C5)alkyl; and
o and p are integers of 1 to 2,
alkyl, alkoxy, alkoxycarbonyl, and aryl of R being further substituted with hydroxy, (C1-C5)alkyl, (C1-C5)alkoxy, or (C1-C5)alkoxycarbonyl.)

The secondary battery electrolyte according to the present invention contains the pyrrole derivative, more specifically, the pyrrole derivative represented by Chemical Formula 1, having a specific structure in which a cyano, alkyl, alkoxy, alkoxycarbonyl, or aryl substituent is present on a nitrogen atom of pyrrole or pyrroline, such that a capacity recovery rate and stability at a high temperature may be high, and discharge capacity at a low temperature may also be significantly excellent.

When ⚌ is a single bond, o and p are an integer of 2, and when ⚌ is a double bond, o and p are an integer of 1. In addition, when o and p are 2, $R^1$ and $R^2$ may be different from or equal to each other.

In the lithium secondary battery electrolyte according to the present invention, the pyrrole derivative represented by Chemical Formula 1 may be represented by the following Chemical Formula 1-1.

[Chemical Formula 1-1]

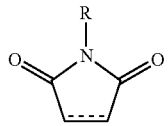

(In Chemical Formula 1-1,
R is cyano, hydroxy, (C1-C5)alkyl, (C1-C5)alkoxy, (C1-C5)alkoxycarbonyl, or (C6-C12)aryl; and
⚌ is a single bond or a double bond;
alkyl, alkoxy, alkoxycarbonyl, and aryl of R being further substituted with hydroxy, (C1-C5)alkyl, (C1-C5)alkoxy, or (C1-C5)alkoxycarbonyl.)

In the lithium secondary battery electrolyte according to an exemplary embodiment of the present invention, R in Chemical Formula 1 may be preferably cyano, (C1-C5)alkyl, or (C1-C5)alkoxycarbonyl. In detail, according to the exemplary embodiment of the present invention, R may be cyano, methyl, ethyl, tert-butyl, methoxycarbonyl, ethoxycarbonyl, propoxycarbonyl, or tert-butoxy.

More specifically, the pyrrole derivative according to the present invention may be selected from compounds having the following structures, but is not limited thereto.

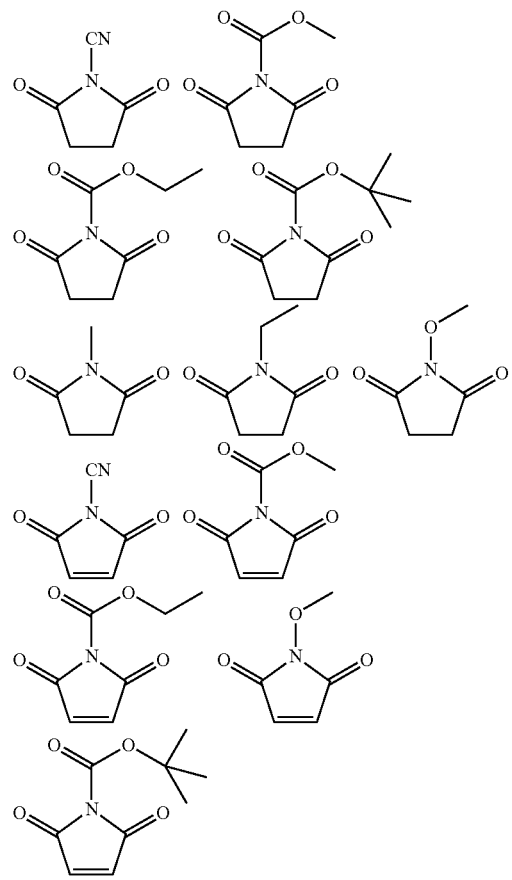

As disclosed herein, the terms ⌈alkyl⌋, ⌈alkoxy⌋, and other substituents including an ⌈alkyl⌋ part include both of the straight chain type and the branched chain type, and have 1 to 10 carbon atoms, preferably 1 to 6 carbon atoms, more preferably 1 to 4 carbon atoms.

In addition, as disclosed herein, the term ⌈aryl⌋, which is an organic radical derived from aromatic hydrocarbon by removing one hydrogen atom therefrom, may include a single ring system or fused ring system containing, properly 4 to 7 ring atoms, and preferably 5 or 6 ring atoms in each ring, and include ring systems in which two or more aryls are combined through single bond(s) A specific example of aryl may include phenyl, naphthyl, biphenyl, anthryl, indenyl, fluorenyl, and the like, but is not limited thereto.

In the lithium secondary battery electrolyte according to the exemplary embodiment of the present invention, the pyrrole derivative represented by Chemical Formula 1 may be contained at a content of 1 to 5 wt % based on a total weight of the lithium secondary battery electrolyte. In view of high-temperature stability, it is more preferable that the pyrrole derivative is contained at a content of 1 to 3 wt %. When the content of the pyrrole derivative represented by Chemical Formula 1 is less than 1 wt %, addition effects such as high-temperature stability, improvement of a capacity retention rate, or the like, are not exhibited, and an effect of improving discharge capacity, output, or the like, of the lithium secondary battery may be insufficient, and when the content of the pyrrole derivative is more than 5 wt %, a life cycle, or the like, is rapidly deteriorated, such that characteristics of the lithium secondary battery may be rather deteriorated.

The lithium secondary battery electrolyte according to the exemplary embodiment of the present invention may further contain one or two or more additives selected from the group consisting of oxalatoborate based compounds, carbonate based compounds substituted with fluorine, vinylidene carbonate based compounds, and compounds containing a sulfinyl group as an additive for improving the life cycle of the battery.

The oxalatoborate based compound may be a compound represented by the following Chemical Formula 2 or lithium bis(oxalato)borate (LiB(C$_2$O$_4$)$_2$, LiBOB).

[Chemical Formula 2]

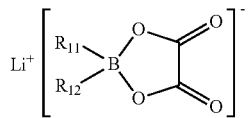

(In Chemical Formula 2, R$_{11}$ and R$_{12}$ are each independently halogen or halogenated (C1-C10)alkyl.)

Specific examples of the oxalatoborate based additive may include lithium difluoro(oxalato)borate (LIB(C$_2$O$_4$)F$_2$, LiFOB), lithium bis(oxalato)borate (LiB(C$_2$O$_4$)$_2$, LiBOB), and the like.

The carbonate based compound substituted with fluorine may be fluoroethylene carbonate (FEC), difluoroethylene carbonate (DFEC), fluorodimethyl carbonate (FDMC), fluoroethyl methyl carbonate (FEMC), or a combination thereof.

The vinylidene carbonate based compound may be vinylene carbonate (VC), vinyl ethylene carbonate (VEC), or a mixture thereof.

The compound containing a sulfinyl (S=O) group may be sulfone, sulfite, sulfonate, and sultone (cyclic sulfonate), and the compound may be used alone or a mixture thereof may be used. In detail, the sulfone may be represented by the following Chemical Formula 3 and be divinyl sulfone. The sulfite may be represented by the following Chemical Formula 4 and be ethylene sulfite or propylene sulfite. The sulfonate may be represented by the following Chemical Formula 5 and be diallyl sulfonate. In addition, non-restrictive examples of the sultone may include ethane sultone, propane sultone, butane sultone, ethene sultone, butene sultone, propene sultone, and the like.

[Chemical Formula 3]

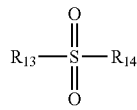

[Chemical Formula 4]

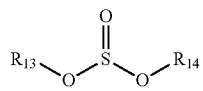

[Chemical Formula 5]

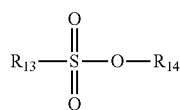

(In Chemical Formulas 3 to 5, R$_{13}$ and R$_{14}$ are each independently hydrogen, halogen, (C1-C10)alkyl, (C2-C10) alkenyl, (C1-C10)alkyl substituted with halogen, or (C2-C10)alkenyl substituted with halogen.)

The lithium secondary battery electrolyte according to the exemplary embodiment of the present invention may further contain an additive selected from the group consisting of lithium difluoro(oxalate)borate (LiFOB), lithium bis(oxalato)borate (LiB(C$_2$O$_4$)$_2$, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone, and propene sultone (PRS). More preferably, the electrolyte may further contain one or two or more additives selected from lithium bis(oxalato)borate (LiB(C$_2$O$_4$)$_2$, LiBOB), vinylene carbonate (VC), vinylethylene carbonate (VEC), ethylene sulfite, ethane sultone, and propane sultone (PS).

In the lithium secondary battery electrolyte according to an exemplary embodiment of the present invention, a content of the additive is not particularly limited, but in order to improve the life cycle of the battery, the additive may be contained in the lithium secondary battery electrolyte at a content of 0.1 to 5 wt %, more preferably 0.1 to 3 wt % based on a total weight of the electrolyte.

In the lithium secondary battery electrolyte according to the exemplary embodiment of the present invention, the non-aqueous organic solvent may include carbonate, ester, ether, or ketone alone, or a mixed solvent thereof, but it is preferable that the non-aqueous organic solvent is selected from cyclic carbonate based solvents, linear carbonate based solvents, and a mixed solvent thereof. It is most preferable to use a mixture of the cyclic carbonate based solvent and the linear carbonate based solvent. The cyclic carbonate solvent may sufficiently dissociate lithium ions due to large polarity, but has a disadvantage in that ion conductivity thereof is small due to a large viscosity. Therefore, characteristics of the lithium secondary battery may be optimized by mixing a linear carbonate solvent that has a small polarity and a low viscosity with the cyclic carbonate solvent.

The cyclic carbonate based solvent may be selected from the group consisting of ethylene carbonate, propylene carbonate, butylene carbonate, vinylene carbonate, vinylethylene carbonate, fluoroethylene carbonate, and a mixture thereof, and the linear carbonate based solvent may be selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

In the lithium secondary battery electrolyte according to the exemplary embodiment of the present invention, in the non-aqueous organic solvent, which is the mixed solvent of the cyclic carbonate based solvent and the linear carbonate based solvent, a mixed volume ratio of the linear carbonate based solvent and the cyclic carbonate based solvent may be 1 to 9:1, preferably 1.5 to 4:1.

In a high-voltage lithium secondary battery electrolyte according to the exemplary embodiment of the present invention, the lithium salt may be one or two or more selected from the group consisting of LiPF$_6$, LiBF$_4$, LiClO$_4$, LiSbF$_6$, LiAsF$_6$, LiN(SO$_2$C$_2$F$_5$)$_2$, LiN(CF$_3$SO$_2$)$_2$, LiN(SO$_3$C$_2$F$_5$)$_2$, LiN(SO$_2$F)$_2$, LiCF$_3$SO$_3$, LiC$_4$F$_9$SO$_3$, LiC$_6$H$_5$SO$_3$, LiSCN, LiAlO$_2$, LiAlCl$_4$, LiN(C$_x$F$_{2x+1}$SO$_2$)(C$_y$F$_{2y+1}$SO$_2$) (here, x and y are natural numbers), LiCl, LiI, and LiB(C$_2$O$_4$)$_2$, but is not limited thereto.

The lithium salt may be used in a concentration range of preferably 0.1 to 2.0M, and more preferably, 0.7 to 1.6M. In the case in which the concentration of the lithium salt is less than 0.1M, conductivity of the electrolyte is decreased, such that performance of the electrolyte is deteriorated, and in the case in which the concentration is more than 2.0M, the viscosity of the electrolyte is increased, such that mobility of the lithium ion may be decreased. The lithium salt acts as a supply source of the lithium ion in the battery to enable a basic operation of the lithium secondary battery.

Since the lithium secondary battery electrolyte according to the exemplary embodiment of the present invention is generally stable in a temperature range of −20 to 60° C., and maintains electrochemically stable characteristics thereof even at a voltage of 4.4V, the lithium second battery electrolyte may be applied to all of the lithium secondary batteries such as a lithium ion battery, a lithium polymer battery, and the like.

In addition, the present invention provides a lithium secondary battery containing the lithium secondary battery electrolyte as described above.

A non-restrictive example of the secondary battery may include a lithium metal secondary battery, a lithium ion secondary battery, a lithium polymer secondary battery, a lithium ion polymer secondary battery, or the like.

The lithium secondary battery manufactured using the lithium secondary battery electrolyte according to the present invention is characterized in that a high-temperature storage efficiency is 76% or more and when the lithium secondary battery was kept at a high temperature for a long period of time, a thickness increase rate of the lithium secondary battery is significantly low (1 to 15%, more preferably 1 to 8%).

The lithium secondary battery according to the present invention includes a cathode and an anode.

It is preferable that the cathode contains a cathode active material capable of intercalating and deintercalating the lithium ion, and it is preferable that the cathode active material as described above is a complex metal oxide of lithium and at least one kind selected from cobalt, manganese, and nickel. A composition rate between the metals may be various, and an element selected from the group consisting of Mg, Al, Co, K, Na, Ca, Si, Ti, Sn, V, Ge, Ga, B, As, Zr, Mn, Cr, Fe, Sr, V, and rare earth elements may be further contained in the cathode active material as well as the above-mentioned metals. As a specific example of the cathode active material, a compound represented by any one of the following Chemical Formulas may be used:

$Li_aA_{1-b}B_bD_2$ (here, $0.90 \leq a \leq 1.8$ and $0 \leq b \leq 0.5$); $Li_aE_{1-b}B_bO_{2-c}D_c$ (here, $0.90 \leq a \leq 1.8$, $0 \leq b \leq 0.5$, and $0 \leq c \leq 0.05$); $LiE_{2-b}B_bO_{4-c}D_c$ (here, $0 \leq b \leq 0.5$ and $0 \leq c \leq 0.05$); $Li_aNi_{1-b-c}Co_bB_cD_\alpha$ (here, $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (here, $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (here, $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (here, $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (here, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (here, $0.90 \leq a \leq 1.8$, $0 \leq b \leq 0.5$, $0 \leq c \leq 0.05$, and $0 < \alpha < 2$); $Li_aNi_bE_cG_dO_2$ (here, $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (here, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (here, $0.90 \leq a \leq 1.8$ and $0.001 \leq b \leq 0.1$); $Li_aCoG_bO_2$ (here, $0.90 \leq a \leq 1.8$ and $0.001 \leq b \leq 0.1$); $Li_aMnG_bO_2$ (here, $0.90 \leq a \leq 1.8$ and $0.001 \leq b \leq 0.1$); $Li_aMn_2G_bO_4$ (here, $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the Chemical Formulas, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The anode contains an anode active material capable of intercalating and deintercalating the lithium ion, and as this anode active material, a carbon material such as crystalloid carbon, amorphous carbon, a carbon complex, a carbon fiber, or the like, a lithium metal, an alloy of lithium and another element, or the like, may be used. Examples of the amorphous carbon may include hard carbon, coke, mesocarbon microbead (MCMB) sintered at a temperature of 1500° C. or less, mesophase pitch-based carbon fiber (MPCF), and the like. Examples of the crystalloid carbon include graphite based materials, more specifically, natural graphite, graphitized coke, graphitized MCMB, graphitized MPCF, and the like. As the carbon material, a material of which an interplanar distance is 3.35 to 3.38 Å, and a crystallite size Lc measured by X-ray diffraction is at least 20 nm or more may be preferable. Another element forming the alloy with lithium may be aluminum, zinc, bismuth, cadmium, antimony, silicon, lead, tin, gallium, or indium.

The cathode or anode may be prepared by dispersing an electrode active material, a binder, and a conductive material, and if necessary, a thickener, in a solvent to prepare an electrode slurry composition, and applying this electrode slurry composition onto an electrode current collector. As a cathode current collector, aluminum, an aluminum alloy, or the like, may be mainly used, and as an anode current collector, copper, a copper alloy, or the like, may be mainly used. The cathode current collector and the anode current collector have a foil or mesh shape.

The binder is a material playing a role in paste formation of the active material, adhesion between the active materials, adhesion with the current collector, and a buffering effect on expansion and contraction of the active material, and the like. Examples of the binder may include polyvinylidene fluoride (PVdF), a polyhexafluoropropylene-polyvinylidene fluoride (PVdF/HFP) copolymer, poly(vinylacetate), polyvinyl alcohol, polyethyleneoxide, polyvinylpyrrolidone, alkylated polyethyleneoxide, polyvinyl ether, poly(methylmethacrylate), poly(ethylacrylate), polytetrafluoroethylene, polyvinylchloride, polyacrylonitrile, polyvinylpyridine, styrene-butadiene rubber, acrylonitrile-butadiene rubber, and the like. A content of the binder is 0.1 to 30 wt %, preferably 1 to 10 wt % based on the electrode active material. In the case in which the content of the binder is excessively low, adhesive force between the electrode active material and the current collector may become insufficient, and in the case in which the content is excessively high, adhesive force may be improved, but a content of the electrode active material is decreased in accordance with the content of the binder, which is disadvantageous in allowing the battery to have high capacity.

The conductive material is used to impart conductivity to the electrode, and any electronic conductive material may be used as long as it does not cause a chemical change in a battery to be configured. At least one selected from the group consisting of a graphite based conductive material, a carbon black based conductive material, and a metal or metal compound based conductive material may be used. Examples of the graphite based conductive material may include artificial graphite, natural graphite, and the like, examples of the carbon black based conductive material may include acetylene black, Ketjen black, Denka black, thermal black, channel black, and the like, and examples of the metal or metal compound based conductive material may include tin, tin oxide, tin phosphate ($SnPO_4$), titanium oxide, potassium titanate, a perovskite material such as $LaSrCoO_3$ and $LaSrMnO_3$. However, the conductive material is not limited thereto.

A content of the conductive material is preferably 0.1 to 10 wt % based on the electrode active material. In the case in which the content of the conductive material is less than 0.1 wt %, electrochemical properties may be deteriorated, and in the case in which the content is more than 10 wt %, energy density per weight may be decreased.

Any thickener may be used without limitation as long as it may serve to adjust a viscosity of the active material slurry, but for example, carboxymethyl cellulose, hydroxymethyl cellulose, hydroxyethyl cellulose, hydroxypropyl cellulose, or the like, may be used.

As the solvent in which the electrode active material, the binder, the conductive material, and the like, are dispersed, a non-aqueous solvent or aqueous solvent may be used. Examples of the non-aqueous solvent may include N-methyl-2-pyrrolidone (NMP), dimethylformamide, dimethylacetamide, N,N-dimethylaminopropylamine, ethyleneoxide, tetrahydrofuran, or the like.

The lithium secondary battery according to the present invention may include a separator preventing a short circuit between the cathode and the anode and providing a movement path of the lithium ion. As the separator as described above, a polyolefin based polymer membrane made of polypropylene, polyethylene, polyethylene/polypropylene, polyethylene/polypropylene/polyethylene, polypropylene/polyethylene/polypropylene, or the like, or a multilayer thereof, a micro-porous film, and woven fabric and non-woven fabric may be used. In addition, a film in which a resin having excellent stability is coated on a porous polyolefin film may be used.

The lithium secondary battery according to the present invention may have various shapes such as a cylindrical shape, a pouch shape, in addition to an angular shape.

Hereinafter, Examples and Comparative Examples of the present invention will be described. However, the following Example is only a preferable example of the present invention, and the present invention is not limited thereto. Under the assumption that the lithium salt is entirely dissociated so that a concentration of lithium ion becomes 1M, a base electrolyte may be formed by dissolving a corresponding amount of the lithium salt such as $LiPF_6$ in a basic solvent so as to have a concentration of 1M.

[Preparation Example 1] Synthesis of N-Cyanosuccinimide (Hereinafter, Referred to as 'PEA42')

After succinimide (2.5 g) and triethylamine (3.9 mL) were dissolved in anhydrous tetrahydrofuran (20 mL) and cooled to 0° C., cyanogenbromide (38 mL, 1M in THF) was slowly added thereto dropwise over 1 hour. Then, a temperature was slowly raised to 25° C., and a reaction was carried out by additionally stirring the mixture for 12 hours. After a solid byproduct was removed by filtering and the resultant was washed with 1M aqueous hydrochloric acid, extraction was performed by injecting ethylacetate into an aqueous layer. A solvent was removed from an organic layer by distillation under reduced pressure, the resultant was re-crystallized in a mixed solvent of ethylacetate and hexane, thereby obtaining N-cyanosuccinimide (1.1 g).

$^1$H NMR ($CDCl_3$, 500 MHz) d 2.99 (s, 4H)

[Preparation Example 2] Synthesis of N-(methoxycarbonyl)maleimide (Hereinafter, Referred to as 'PEA44')

After maleimide (3.2 g) and N-methylmorpholine (3.2 mL) were dissolved in ethylacetate (150 mL) and cooled to 0° C., methylchloroformate (2.54 mL) was added thereto. After a reaction was carried out by stirring for 3 hours, a solid byproduct was removed by filtering, and the filtrate was washed with purified water. After an organic layer was dried by adding anhydrous magnesium sulfate and filtered, water and a solvent were removed by distillation under reduced pressure. The resultant was re-crystallized in a mixed solvent of ethylacetate and diethylether, thereby obtaining N-(methoxycarbonyl)maleimide (3.6 g).

$^1$H NMR ($CDCl_3$, 500 MHz) d 6.89 (s, 2H), 3.98 (s, 3H)

[Preparation Example 3] Synthesis of N-Cyanomaleimide (Hereinafter, Referred to as 'PEA56')

After maleimide (2.5 g) and triethylamine (3.9 mL) were dissolved in anhydrous tetrahydrofuran (20 mL) and cooled to 0° C., cyanogenbromide (38 mL, 1M in THF) was slowly added thereto dropwise over 1 hour. Then, a temperature was slowly raised to 25° C., and a reaction was carried out by additionally stirring the mixture for 12 hours. After a solid byproduct was removed by filtering and the resultant was washed with 1M aqueous hydrochloric acid, extraction was performed by injecting ethylacetate into an aqueous layer. A solvent was removed from an organic layer by distillation under reduced pressure, the resultant was re-crystallized in dichloromethane, thereby obtaining N-cyanomaleimide (1.1 g).

$^1$H NMR ($CDCl_3$, 500 MHz) d 7.39 (s, 2H)

Examples 1 to 8 and Comparative Examples 1 and 2

A solution obtained by dissolving $LiPF_6$ in a mixed solvent in which ethylene carbonate (EC) and ethyl methyl carbonate (EMC) were mixed at a volume ratio of 3:7 so as to have a concentration of 1.0M was used as a basic electrolyte (1M $LiPF_6$, EC/EMC=3:7), and ingredients shown in the following Table 1 were additionally injected, thereby preparing electrolytes.

A battery to which the non-aqueous electrolyte was applied was manufactured as follows.

After mixing $LiNiCoMnO_2$ and $LiMn_2O_4$ at a weight ratio of 1:1 as a cathode active material, the cathode active material, polyvinylidene fluoride (PVdF) as a binder, and carbon as a conductive material were mixed at a weight ratio of 92:4:4 and then dispersed in N-methyl-2-pyrrolidone, thereby preparing cathode slurry. This slurry was coated on aluminum foil having a thickness of 20 μm, dried, and rolled, thereby preparing a cathode. After artificial graphite as an anode active material, styrene-butadiene rubber as a binder, and carboxymethyl cellulose as a thickener were mixed at a weight ratio of 96:2:2, the mixture was dispersed in water, thereby preparing anode active material slurry. This slurry was coated on copper foil having a thickness of 15 μm, dried, and rolled, thereby preparing an anode.

A film separator made of a polyethylene (PE) material and having a thickness of 25 μm was stacked between the manufactured electrodes, and a cell was configured using a pouch having a size of 8 mm×270 mm×185 mm (thickness× width×length), followed by injection of the non-aqueous electrolyte, thereby manufacturing a 25Ah-class lithium secondary battery for an electric vehicle (EV).

Performance of the 25Ah-class lithium secondary battery for an electric vehicle (EV) manufactured as described above was evaluated as follows. Evaluation items are as follows.

Evaluation Item *

1. 1 C Discharge capacity at −20° C.: After the battery was charged at room temperature for 3 hours (25 A, 4.2 V constant current-constant voltage (CC-CV)), the battery was kept at −20° C. for 4 hours, and then, the battery was discharged to 2.7 V (25 A, CC). Thereafter, usable capacity (%) with respect to initial capacity was measured.

2. Capacity Recovery Rate after 30 Days at 60° C.: After the battery was charged at room temperature for 3 hours (25 A, 4.2 V, CC-CV), the battery was kept at 60° C. for 30 days, and then, the battery was discharged to 2.7V (25 A, CC). Thereafter, usable capacity (%) with respect to initial capacity was measured.

3. Thickness Increase Rate after 30 days at 60° C.: When a thickness of the battery after charging the battery at room temperature for 3 hours (12.5 A, 4.4V, CC-CV) was defined as A, and a thickness of the battery kept at 60° C. and an atmospheric pressure for 30 days using a closed thermostatic device was defined as B, a thickness increase rate was calculated by the following Equation 1.

$$(B-A)/A \times 100(\%)$$ [Equation 1]

4. Life Cycle at Room Temperature: A process of charging the battery at room temperature (50 A, 4.4V, CC-CV) for 3 hours and then discharging the battery to 2.7V (2.7V, 25 A) was repeated 500 times. In this case, discharge capacity at a first time was defined as C, and discharge capacity at a 300th time was divided by the discharge capacity C at the first time, thereby calculating a capacity retention rate during the life cycle.

TABLE 1

| | Electrolyte Composition | After 30 Days at 60° C. Capacity Recovery Rate | After 30 Days at 60° C. Thickness Increase Rate | Capacity Retention Rate during Life cycle | Discharge Capacity (at −20° C.) |
|---|---|---|---|---|---|
| Example 1 | Basic Electrolyte + PEA42 1 wt % | 86% | 8% | 82% | 69% |
| Example 2 | Basic Electrolyte + PEA44 1 wt % | 79% | 11% | 87% | 81% |
| Example 3 | Basic Electrolyte + PEA56 1 wt % | 78% | 10% | 83% | 77% |
| Example 4 | Basic Electrolyte + PEA42 0.5 wt % | 82% | 13% | 76% | 71% |
| Example 5 | Basic Electrolyte + PEA42 3 wt % | 88% | 4% | 86% | 65% |
| Example 6 | Basic Electrolyte + PEA42 1 wt % + VC 1 wt % | 89% | 4% | 89% | 71% |
| Example 7 | Basic Electrolyte + PEA42 1 wt % + VC 1 wt % + PS 1 wt % | 88% | 3% | 91% | 63% |
| Example 8 | Basic Electrolyte + PEA42 1 wt % + VC 1 wt % + LiBOB 1 wt % | 91% | 5% | 90% | 78% |
| Comparative Example 1 | Basic Electrolyte | 37% | 30% | 20% | 55% |
| Comparative Example 2 | Basic Electrolyte + VC 1 wt % + PS 1 wt % | 60% | 12% | 61% | 48% |

Basic Electrolyte: 1M LiPF$_6$, EC/EMC = 3:7
LiBOB: Lithium-bis(Oxalato)Borate
VC: Vinylene carbonate
PS: 1,3-propane sultone As illustrated in Table 1, it may be appreciated that in the lithium secondary battery containing the lithium secondary battery electrolyte according to the present invention, high-temperature storage efficiency was 80% or more. Further, it was confirmed that in the lithium secondary battery using the lithium secondary battery electrolyte containing the pyrrole derivative represented by Chemical Formula 1 according to the present invention, a thickness increase rate of the battery at the time of keeping the battery at a high temperature for a long period of time was significantly low (1 to 15%), and a capacity retention rate during a life cycle was excellent (70% or more) (Examples 1 to 8). On the other hand, it may be appreciated that in Comparative Examples 1 and 2, high-temperature storage efficiency was low, a thickness increase rate of the battery at the time of keeping the battery at a high temperature for a long period of time was significantly high (30% to 60%), and a capacity retention rate during a life cycle was also significantly low (the capacity retention rates in Comparative Examples 1 and 2 were 20 and 61%, respectively).

These results may be due to structural features of the compounds to be added to the basic electrolyte. That is, it may be appreciated that the secondary battery electrolyte according to the present invention contains the pyrrole derivative represented by Chemical Formula 1, such that storage stability at a high temperature and the capacity retention rate during the life cycle may be high, and discharge capacity at −20° C. also was high.

In more detail, it may be appreciated that the secondary battery electrolyte according to the present invention further contains one or more additives selected from lithium bis (oxalate)borate (LiB(C$_2$O$_4$)$_2$, LiBOB), vinylene carbonate (VC), vinylethylene carbonate (VEC), ethylene sulfite, ethane sultone, propane sultone (PS) in addition to the pyrrole derivative represented by Chemical Formula 1, such that storage stability and life cycle characteristics may be further improved.

That is, among electrolytes containing the pyrrole derivative according to the present invention and vinylidene carbonate based compounds as a life cycle improving additive, particularly, in a combination using vinylene carbonate, a combination of vinylene carbonate and LiBO, and a combination of vinylene carbonate and propane sultone, high-temperature storage stability and efficiency were significantly high.

Although the exemplary embodiments of the present invention have been disclosed in detail, those skilled in the art will appreciate that various modifications are possible, without departing from the scope and spirit of the invention as disclosed in the accompanying claims. Accordingly, such modifications of the exemplary embodiment of the present invention should also be understood to fall within the scope of the present invention.

The invention claimed is:

1. A secondary buttery electrolyte comprising:
a lithium salt;
a non-aqueous organic solvent; and
a pyrrole derivative represented by the following chemical formula 1:

[Chemical Formula 1]

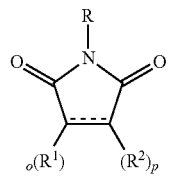

(in Chemical Formula 1,
R is a cyano;
⚌ is a single bond or a double bond;
$R^1$ and $R^2$ are each independently hydrogen or (C1-C5) alkyl; and
o and p are integers of 1 to 2.

2. The secondary battery electrolyte of claim 1, wherein the pyrrole derivative represented by Chemical Formula 1 is selected from compounds having the following structures:

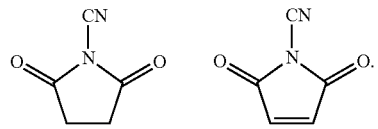 [SMILES: N#CN1C(=O)CCC1=O ; N#CN1C(=O)C=CC1=O]

3. The secondary battery electrolyte of claim 1, wherein the pyrrole derivative is contained at a content of 0.1 to 5 wt % based on a total weight of the electrolyte.

4. The secondary battery electrolyte of claim 1, further comprising one or two or more additives selected from the group consisting of oxalatoborate based compounds optionally substituted with an halogen, carbonate based compounds substituted with fluorine, vinylidene carbonate based compounds, and compounds containing a sulfinyl group.

5. The secondary battery electrolyte of claim 4, further comprising an additive selected from the group consisting of lithium difluoro(oxalato)borate (LiFOB), lithium bis(oxalato)borate (LiB(C2O4)2, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone, and propene sultone (PRS).

6. The secondary battery electrolyte of claim 4, wherein the additive is contained at a content of 0.1 to 5.0 wt % based on a total weight of the electrolyte.

7. The secondary battery electrolyte of claim 1, wherein the non-aqueous organic solvent is selected from cyclic carbonate based solvents, linear carbonate based solvent, and a mixed solvent thereof.

8. The secondary battery electrolyte of claim 7, wherein the cyclic carbonate is selected from the group consisting of ethylene carbonate, propylene carbonate, butylene carbonate, vinylene carbonate, vinylethylene carbonate, fluoroethylene carbonate, and a mixture thereof, and the linear carbonate is selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

9. The secondary battery electrolyte of claim 7, wherein the non-aqueous organic solvent is a mixed solvent in which the linear carbonate solvent and the cyclic carbonate solvent are mixed at a mixed volume ratio of 1 to 9:1.

10. The secondary battery electrolyte of claim 1, wherein the lithium salt is one or two or more selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiA_1O_2$, $LiAlCl_4$, $LiN(C_xF_{2x+1}SO_2)(C_yF_{2y+1}SO_2)$ (here, x and y are natural numbers), LiCl, LiI, and $LiB(C_2O_4)_2$.

11. The secondary battery electrolyte of claim 1, wherein the lithium salt is contained at a concentration of 0.1 to 2.0M.

12. A lithium secondary battery comprising a cathode, an anode, a separator, and the secondary battery electrolyte of claim 1.

13. The lithium secondary battery of claim 12, wherein the cathode comprises a cathode active material comprising a complex metal oxide that comprises at least one selected from cobalt, manganese, and nickel; and lithium.

14. The lithium secondary battery of claim 12, wherein the anode comprises an anode active material comprising crystalline carbon, amorphous carbon, carbon composite, carbon fiber, lithium metal, or alloys of lithium and other elements.

15. The lithium secondary battery of claim 12, wherein the lithium secondary battery has 75% or more of high-temperature storage efficiency.

16. The lithium secondary battery of claim 15, wherein an increase rate of thickness after the lithium secondary battery is left at 60° C. under atmospheric pressure for 30 days is 1 to 15%.

* * * * *

UNITED STATES PATENT AND TRADEMARK OFFICE
CERTIFICATE OF CORRECTION

PATENT NO. : 10,177,410 B2
APPLICATION NO. : 15/104721
DATED : January 8, 2019
INVENTOR(S) : Jin Sung Kim et al.

It is certified that error appears in the above-identified patent and that said Letters Patent is hereby corrected as shown below:

In the Claims

Column 15, Line 16, Claim 1, delete "buttery" and insert -- battery --

Column 15, Line 32, Claim 1, delete "(in" and insert -- in --

Column 15, Line 58, Claim 5, after "claim 4," delete "further"

Column 16, Line 2, Claim 5, delete "(LiB(C2O4)2," and insert -- $(LiB(C_2O_4)_2)$, --

Column 16, Line 33, Claim 10, delete "$LiA_1O_2$," and insert -- $LiAlO_2$, --

Signed and Sealed this
Fourteenth Day of May, 2019

Andrei Iancu
*Director of the United States Patent and Trademark Office*